United States Patent
Suzuki et al.

(10) Patent No.: US 10,753,298 B2
(45) Date of Patent: Aug. 25, 2020

(54) CONTROLLER FOR INTERNAL COMBUSTION ENGINE

(71) Applicant: TOYOTA JIDOSHA KABUSHIKI KAISHA, Toyota-shi, Aichi-ken (JP)

(72) Inventors: Tatsuaki Suzuki, Okazaki (JP); Yuki Nose, Kasugai (JP); Keiichi Myojo, Okazaki (JP); Yoshiyuki Shogenji, Toyota (JP); Eiji Ikuta, Oobu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 110 days.

(21) Appl. No.: 16/055,475

(22) Filed: Aug. 6, 2018

(65) Prior Publication Data

US 2019/0048818 A1 Feb. 14, 2019

(30) Foreign Application Priority Data

Aug. 9, 2017 (JP) .................. 2017-154508

(51) Int. Cl.
*F01N 3/10* (2006.01)
*F02D 41/14* (2006.01)
(Continued)

(52) U.S. Cl.
CPC ........... *F02D 41/1454* (2013.01); *F01N 3/10* (2013.01); *F01N 3/101* (2013.01); *F01N 3/2033* (2013.01); *F02D 41/008* (2013.01); *F02D 41/025* (2013.01); *F02D 41/144* (2013.01); *F02D 41/2448* (2013.01); *F02D 41/2454* (2013.01);
(Continued)

(58) Field of Classification Search
CPC .. F02D 41/1454; F02D 41/025; F02D 41/008; F02D 41/2448; F02D 41/2454; F02D 41/144; F02D 41/40; F02D 41/34; F02D 41/024; F01N 3/10; F01N 3/2033;
(Continued)

(56) References Cited

U.S. PATENT DOCUMENTS 5,462,039 A * 10/1995 Mamiya .............. F02D 41/1408
123/686
6,311,482 B1 * 11/2001 Yamashita ............. B60K 6/485
60/284
(Continued)

FOREIGN PATENT DOCUMENTS

JP 2012-057492 3/2012
JP 2012057492 A * 3/2012

*Primary Examiner* — Matthew T Largi
(74) *Attorney, Agent, or Firm* — Finnegan, Henderson, Farabow, Garrett & Dunner, LLP

(57) ABSTRACT

A controller includes an air-fuel ratio control unit that calculates an air-fuel ratio F/B correction value and an air-fuel ratio learning value and corrects an amount of fuel supplied to each cylinder based on the air-fuel ratio F/B correction value FAF and the air-fuel ratio learning value KG. The controller further includes a dither control unit that executes dither control to adjust the amount of fuel supplied to each cylinder, corrected by the air-fuel ratio control unit, so that at least one of the cylinders is set to a rich combustion cylinder and at least a further one of the cylinders is set to a lean combustion cylinder. When the dither control is executed, the air-fuel ratio control unit prohibits execution of air-fuel ratio learning control and executes air-fuel ratio feedback control.

8 Claims, 5 Drawing Sheets

(51) Int. Cl.
  *F01N 3/20* (2006.01)
  *F02D 41/24* (2006.01)
  *F02D 41/00* (2006.01)
  *F02D 41/02* (2006.01)
  *F02D 41/34* (2006.01)
  *F02D 41/40* (2006.01)

(52) U.S. Cl.
  CPC .. *F01N 2430/06* (2013.01); *F01N 2900/1602* (2013.01); *F02D 41/34* (2013.01); *F02D 41/40* (2013.01)

(58) Field of Classification Search
  CPC ............. F01N 3/101; F01N 2430/06; F01N 2900/1602
  See application file for complete search history.

(56) References Cited

U.S. PATENT DOCUMENTS

2004/0187479 A1* 9/2004 Surnilla ............... F01N 3/0814
  60/285
2005/0109318 A1* 5/2005 Ichihara .............. F02D 41/0085
  123/406.45
2018/0179972 A1* 6/2018 Nose .................... F02D 41/008

* cited by examiner

CONTROLLER FOR INTERNAL COMBUSTION ENGINE

BACKGROUND ART

The present disclosure relates to a controller for an internal combustion engine that includes a catalyst in an exhaust passage, to which exhaust gas is discharged from a plurality of cylinders. The catalyst purifies the exhaust gas.

Japanese Laid-Open Patent Publication No. 2012-57492 describes a controller for an internal combustion engine that executes air-fuel ratio feedback control. Air-fuel ratio feedback control is executed so that an air-fuel ratio detection value, which is calculated based on an output signal of an air-fuel ratio sensor arranged in the exhaust passage of the internal combustion engine, approaches a target air-fuel ratio. At this time, an air-fuel ratio feedback correction value is updated to decrease the deviation of the air-fuel ratio detection value from the target air-fuel ratio. The air-fuel feedback correction value is used to correct the amount of fuel supplied to each cylinder so that the air-fuel ratio detection value approaches the target air-fuel ratio.

The device described in this publication also executes perturbation control (dither control) to increase the temperature of a three-way catalyst arranged in the exhaust passage. In dither control, some of the cylinders are set to rich combustion cylinders, in which the mixture has an air-fuel ratio that is richer than the stoichiometric air-fuel ratio. The remaining cylinders are set to lean combustion cylinders, in which the mixture has an air-fuel ratio that is leaner than the stoichiometric air-fuel ratio. Additionally, the amount of fuel supplied to each cylinder is adjusted so that an average value of the air-fuel ratios of mixtures in all of the cylinders including the rich combustion cylinders and the lean combustion cylinders equals the target air-fuel ratio. When dither control is executed, unburned fuel components and incomplete combustion components contained in the exhaust gas discharged from the rich combustion cylinders are oxidized in the exhaust passage by oxygen contained in the exhaust gas discharged from the lean combustion cylinders. This increases the temperature of the three-way catalyst.

When air-fuel ratio feedback control is executed, the air-fuel ratio feedback correction value needs to be prevented from having an excessive absolute value. In this regard, air-fuel ratio learning control may be executed to obtain an air-fuel ratio learning value based on the result of air-fuel ratio feedback control. In a controller that executes air-fuel ratio learning control in addition to air-fuel ratio feedback control, the air-fuel ratio learning value is used in addition to the air-fuel ratio feedback correction value. Thus, while limiting the increase in the absolute value of the air-fuel ratio feedback correction value, the amount of fuel supplied to each cylinder is corrected so that the air-fuel ratio detection value approaches the target air-fuel ratio.

During execution of dither control, the lean combustion cylinders discharge exhaust gas containing a large amount of oxygen to the exhaust passage. The rich combustion cylinders discharge exhaust gas containing a small amount of oxygen to the exhaust passage. Thus, during dither control, the exhaust gas passing through the air-fuel ratio sensor in the exhaust passage may contain a large amount of oxygen or a small amount of oxygen. This causes the air-fuel ratio detection value to easily vary and may lower the accuracy of an update of the air-fuel ratio learning value performed by air-fuel ratio learning control. If an air-fuel ratio learning value obtained with low accuracy is used to control the air-fuel ratio, the controllability may be lowered.

SUMMARY OF THE INVENTION

To solve the above problem, a first aspect of the present invention provides a controller for an internal combustion engine that includes a catalyst arranged in an exhaust passage into which exhaust gas is discharged from a plurality of cylinders. The catalyst purifies the exhaust gas. The controller includes an air-fuel ratio control unit that is configured to correct an amount of fuel supplied to each of the plurality of cylinders based on an air-fuel ratio feedback correction value and an air-fuel ratio learning value. The controller further includes a dither control unit that is configured to execute dither control when there is a request for increasing a temperature of the catalyst. The dither control adjusts the amount of fuel supplied to each of the plurality of cylinders that is corrected by the air-fuel ratio control unit so that at least one of the plurality of cylinders is set to a rich combustion cylinder in which an air-fuel ratio of a mixture is richer than a stoichiometric air-fuel ratio and at least a further one of the plurality of cylinders is set to a lean combustion cylinder in which an air-fuel ratio of a mixture is leaner than the stoichiometric air-fuel ratio. The air-fuel ratio control unit is configured to execute air-fuel ratio feedback control that updates the air-fuel ratio feedback correction value to decrease a deviation of an air-fuel ratio detection value calculated based on a detection signal of an air-fuel ratio sensor from a target air-fuel ratio. The air-fuel ratio control unit is configured to execute air-fuel ratio learning control that updates the air-fuel ratio learning value to decrease an absolute value of the air-fuel ratio feedback correction value. The air-fuel ratio control unit is configured to prohibit execution of the air-fuel ratio learning control and execute the air-fuel ratio feedback control when the dither control is executed.

Other aspects and advantages of the embodiments will become apparent from the following description, taken in conjunction with the accompanying drawings, illustrating by way of example the principles of the invention.

BRIEF DESCRIPTION OF THE DRAWINGS

The embodiments, together with objects and advantages thereof, may best be understood by reference to the following description of the presently preferred embodiments together with the accompanying drawings in which.

DESCRIPTION OF THE EMBODIMENTS

One embodiment of a controller for an internal combustion engine will now be described with reference to FIGS. 1 to 6.

Figure 1:
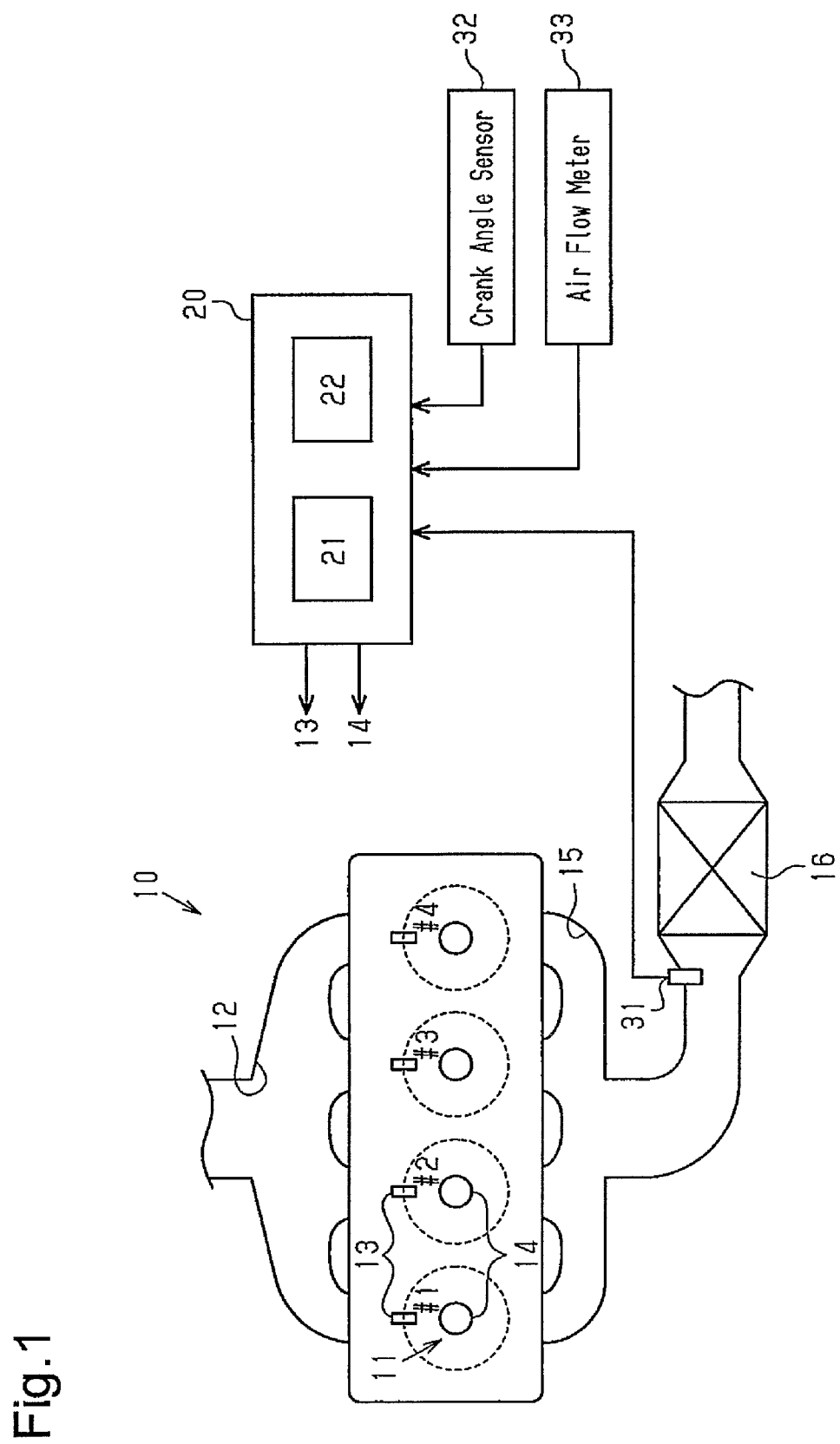
FIG. 1 is a schematic diagram of an internal combustion engine including a first embodiment of a controller according to the present invention.

As shown in FIG. 1, an internal combustion engine 10 includes four cylinders #1, #2, #3, and #4, an intake passage 12, and fuel injection valves 13 equal to the cylinders in number. Air flows through the intake passage 12 into combustion chambers 11 of the cylinders #1 to #4. The fuel injection valves 13 are respectively driven to supply fuel to the combustion chambers 11. Each combustion chamber 11 is supplied with the air drawn in from the intake passage 12 and fuel injected from the fuel injection valve 13. In the combustion chamber 11, the mixture including the air and the fuel is burned by a spark discharge of an ignition device 14. The burned mixture is discharged as exhaust gas from the combustion chamber 11 to an exhaust passage 15. The exhaust passage 15 is provided with a three-way catalyst 16 that purifies the exhaust gas.

A controller 20 executes various controls related to running of the internal combustion engine 10. The controller 20 includes a CPU 21 executing various engine controls and a memory 22 storing information needed for the engine controls. The internal combustion engine 10 receives detection signals from various sensors such as an air-fuel ratio sensor 31, a crank angle sensor 32, and an air flow meter 33. The air-fuel ratio sensor 31 is arranged at the upstream side of the three-way catalyst 16 in the exhaust passage 15. The air-fuel ratio sensor 31 outputs a signal corresponding to an oxygen concentration of the exhaust gas flowing through the exhaust passage 15. The controller 20 calculates an air-fuel ratio detection value AF, which is a detected value of an air-fuel ratio, based on the detection signal of the air-fuel ratio sensor 31. The crank angle sensor 32 outputs a signal corresponding to an engine rotation speed NE, which is a rotation speed of an output shaft of the engine. The air flow meter 33 is arranged in the intake passage 12. The air flow meter 33 outputs a signal corresponding to an intake air amount GA.

The controller 20 executes air-fuel ratio feedback control (hereafter, referred to as air-fuel ratio F/B control), air-fuel ratio learning control, and dither control, which are part of the engine controls. Air-fuel ratio F/B control updates an air-fuel ratio feedback correction value FAF (hereafter, referred to as air-fuel ratio F/B correction value) to decrease a deviation (=|AFT−AF|) of the air-fuel ratio detection value AF from a target air-fuel ratio AFT, which is a target value of an air-fuel ratio. Air-fuel ratio learning control updates an air-fuel ratio learning value KG to decrease an absolute value of the air-fuel ratio F/B correction value FAF. Dither control is executed to increase the temperature of the three-way catalyst 16 arranged in the exhaust passage 15.

Figure 2:
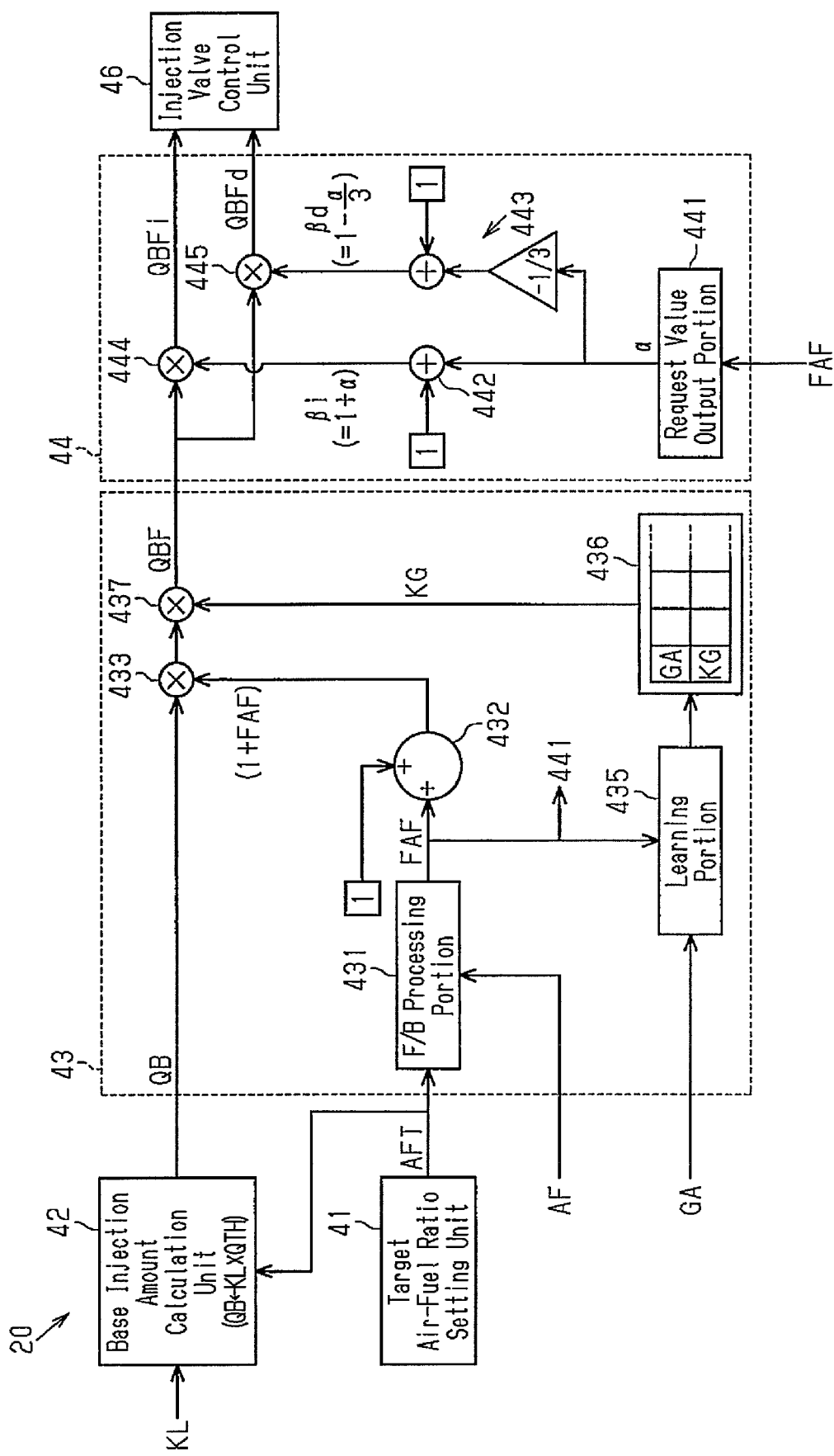
FIG. 2 is a block diagram of the controller.

As shown in FIG. 2, the controller 20 includes a target air-fuel ratio setting unit 41, a base injection amount calculation unit 42, an air-fuel ratio control unit 43, a dither control unit 44, and an injection valve control unit 46 to execute air-fuel ratio F/B control, air-fuel ratio learning control, and dither control.

The target air-fuel ratio setting unit 41 sets the target air-fuel ratio AFT based on, for example, a running state of the engine. The base injection amount calculation unit 42 receives an engine load rate KL and calculates a base injection amount QB based on the engine load rate KL. The base injection amount QB is obtained by multiplying a specified full load theoretical injection amount QTH by the engine load rate KL. The full load theoretical injection amount QTH is a calculated value of a fuel injection amount when the engine load rate KL is 100% and the air-fuel ratio detection value AF is equal to the target air-fuel ratio AFT. The engine load rate KL may be calculated based on the engine rotation speed NE and the intake air amount GA.

The air-fuel ratio control unit 43 includes an F/B processing portion 431 that executes air-fuel ratio F/B control to calculate the air-fuel ratio F/B correction value FAF. When the air-fuel ratio detection value AF is leaner than the target air-fuel ratio AFT and the air-fuel ratio detection value AF is to be richer, the air-fuel ratio control unit 43 increases the air-fuel ratio F/B correction value FAF. When the air-fuel ratio detection value AF is richer than the target air-fuel ratio AFT and the air-fuel ratio detection value AF is to be leaner, the air-fuel ratio control unit 43 decreases the air-fuel ratio F/B correction value FAF.

The air-fuel ratio control unit 43 further includes an addition portion 432 that adds one to the air-fuel ratio F/B correction value FAF, which is calculated by the F/B processing portion 431. The air-fuel ratio control unit 43 further includes a first multiplication portion 433 that corrects the base injection amount QB. The first multiplication portion 433 corrects the base injection amount QB, which is calculated by the base injection amount calculation unit 42, by multiplying the base injection amount QB by the calculation result (=1+FAF) obtained by the addition portion 432.

The air-fuel ratio control unit 43 further includes a learning portion 435 that executes air-fuel ratio learning control to update the air-fuel ratio learning value KG on a condition that a predetermined air-fuel ratio learning condition is satisfied. The air-fuel ratio control unit 43 further includes a learning value storage portion 436 that stores the learning result of the learning portion 435. The air-fuel ratio learning condition includes a condition that the purge rate, which is used to adjust the amount of fuel (vaporized fuel) flowing into the intake passage 12 from a canister, is 0%, a condition that the target air-fuel ratio AFT is equal to the stoichiometric air-fuel ratio, and a condition that air-fuel ratio F/B control is continuously executed for a specified time or longer.

The air-fuel ratio learning value KG is set for each learning region separated in accordance with the intake air amount GA. For example, in a first learning region of the learning regions, the learning value storage portion 436 stores a value that decreases the absolute value of the air-fuel ratio F/B correction value FAF when the engine is running in the first learning region as the air-fuel ratio learning value KG for the first learning region. If the absolute value of the air-fuel ratio F/B correction value FAF is less than a specified value during the running of the engine in the first learning region, it can be determined that increases in the absolute value of the air-fuel ratio F/B correction value FAF are limited during the running of the engine in the first learning region. Hence, the learning portion 435 determines that the update of the air-fuel ratio learning value KG for the first learning region is completed.

During execution of dither control, the learning portion 435 prohibits execution of air-fuel ratio learning control. Additionally, the air-fuel ratio control unit 43 includes a second multiplication portion 437 that further corrects the base injection amount QB, which is corrected by the first multiplication portion 433, with the air-fuel ratio learning value KG. The second multiplication portion 437 retrieves the air-fuel ratio learning value KG for the learning region in which the engine is currently running from the learning value storage portion 436. The second multiplication portion 437 multiplies the retrieved air-fuel ratio learning value KG by the base injection amount QB to obtain a request injection amount QBF, which is a requested amount of supply to the cylinders #1 to #4.

When a predetermined dither control execution condition is satisfied, the dither control unit 44 executes dither control. The dither control execution condition includes a condition that the update of the air-fuel ratio learning value KG is completed in all of the learning regions, a condition that there is a request for increasing the temperature of the three-way catalyst 16, and a condition that the target air-fuel ratio AFT is equal to the stoichiometric air-fuel ratio.

In dither control of the present embodiment, the request injection amount QBF of the cylinders #1 to #4 calculated by the air-fuel ratio control unit 43 is corrected so that the following conditions are satisfied.

(Condition 1) The first cylinder #1 is a rich combustion cylinder, in which the air-fuel ratio of the mixture is richer than the target air-fuel ratio AFT (i.e., stoichiometric air-fuel ratio). The remaining cylinders #2 to #4 other than the first cylinder #1 are lean combustion cylinders, in which the air-fuel ratio of the mixture is leaner than the target air-fuel ratio AFT (i.e., stoichiometric air-fuel ratio).

(Condition 2) The average value of air-fuel ratios of mixtures in all of the cylinders #1 to #4 including rich combustion cylinders and lean combustion cylinders equals to the target air-fuel ratio AFT.

The dither control unit 44 includes a request value output portion 441 that calculates an injection amount correction request value $\alpha$ in dither control. The injection amount correction request value $\alpha$ is a positive value. The dither control unit 44 further includes a rich correction request value calculator 442 that calculates an injection amount correction request value $\beta i$ for a rich combustion cylinder. The dither control unit 44 further includes a lean correction request value calculator 443 that calculates an injection amount correction request value $\beta d$ for a lean combustion cylinder. The rich correction request value calculator 442 calculates a value by adding one to the injection amount correction request value $\alpha$, which is calculated by the request value output portion 441, as the injection amount correction request value $\beta i$ for a rich combustion cylinder. The lean correction request value calculator 443 calculates a value by adding one to a product of "$-\frac{1}{3}$" and the injection amount correction request value $\alpha$, which is calculated by the request value output portion 441, as the injection amount correction request value $\beta d$ for a lean combustion cylinder.

The dither control unit 44 further includes a rich correction processing portion 444 that calculates an injection amount instruction value QBFi for a rich combustion cylinder. The dither control unit 44 further includes a lean correction processing portion 445 that calculates an injection amount instruction value QBFd for a lean combustion cylinder. The rich correction processing portion 444 calculates a value by multiplying the request injection amount QBF, which is calculated by the air-fuel ratio control unit 43, by the injection amount correction request value $\beta i(=1+a)$ for a rich combustion cylinder as the injection amount instruction value QBFi for a rich combustion cylinder. The lean correction processing portion 445 calculates a value by multiplying the request injection amount QBF, which is calculated by the air-fuel ratio control unit 43, by the injection amount correction request value $\beta d$ for a lean combustion cylinder ($=1-\alpha/3$) as the injection amount instruction value QBFd for a lean combustion cylinder.

The injection valve control unit 46 drives the fuel injection valve 13 of the first cylinder #1 so that the amount of fuel injected from the fuel injection valve 13 of the first cylinder #1 equals to the injection amount instruction value QBFi for a rich combustion cylinder. The injection valve control unit 46 drives the fuel injection valves 13 of the remaining cylinders #2 to #4 other than the first cylinder #1 so that the amount of fuel injected from the fuel injection valve 13 of each of the cylinders #2 to #4 equals to the injection amount instruction value QBFd for a lean combustion cylinder.

A process routine executed by the learning portion 435 of the air-fuel ratio control unit 43 will now be described with reference to FIGS. 3 and 4. This process routine is repeatedly executed.

Figure 3:
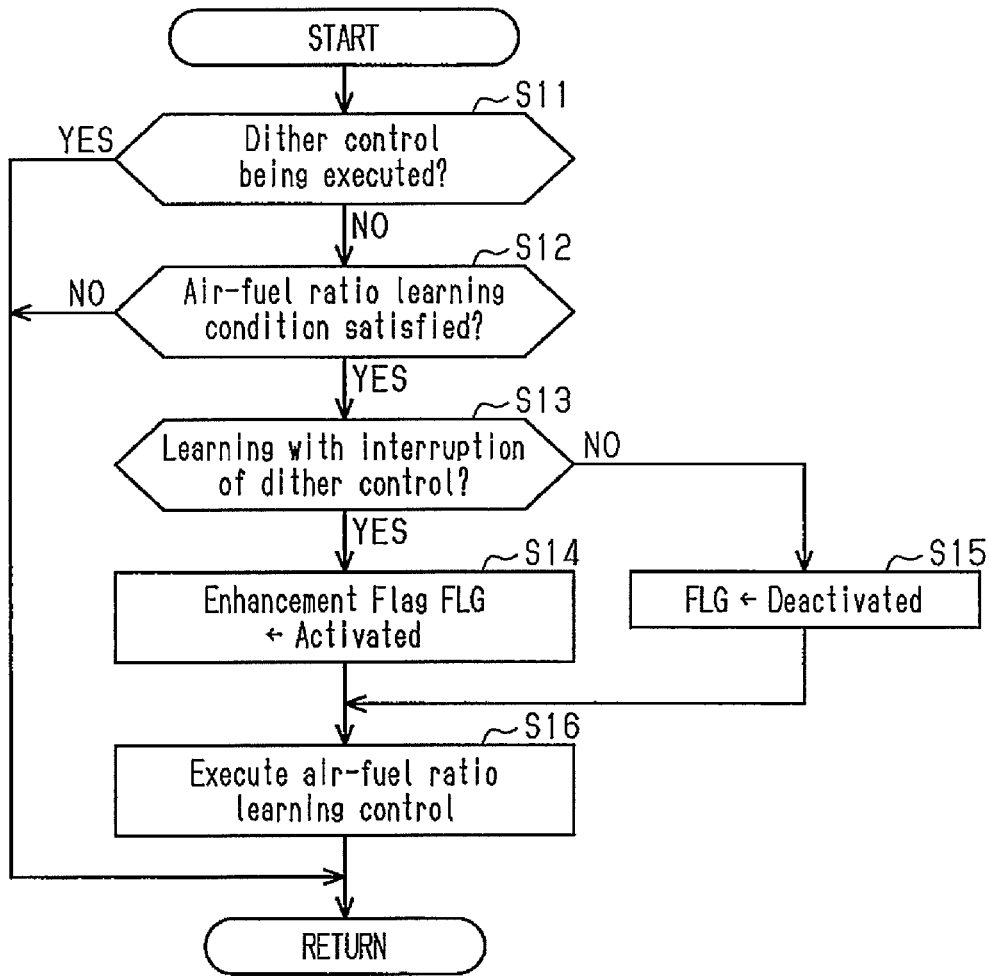
FIG. 3 is a flowchart showing a process routine executed when air-fuel ratio learning control is executed.

As shown in FIG. 3, in the process routine, the learning portion 435 determines whether or not dither control is being executed (step S11). If dither control is being executed (step S11: YES), execution of air-fuel ratio learning control is prohibited. Thus, the learning portion 435 ends the process routine. If dither control is not executed (step S11: NO), execution of air-fuel ratio learning control is not prohibited or prohibition of execution of air-fuel ratio learning control is cancelled. Thus, the learning portion 435 determines whether or not the air-fuel ratio learning condition is satisfied (step S12). If the air-fuel ratio learning condition is not satisfied (step S12: NO), the learning portion 435 ends the process routine. If the air-fuel ratio learning condition is satisfied (step S12: YES), the learning portion 435 determines whether or not air-fuel ratio learning control is executed based on an interruption of execution of dither control caused by satisfaction of a dither control termination condition, which will be described later (step S13). For example, when there is a request for increasing the temperature of the three-way catalyst 16, the learning portion 435 determines that air-fuel ratio learning control is executed based on an interruption of execution of dither control caused by satisfaction of the termination condition. When there is no request for increasing the temperature of the three-way catalyst 16, the learning portion 435 determines that execution of air-fuel ratio learning control is not based on an interruption of execution of dither control caused by satisfaction of the termination condition. That is, the learning portion 435 determines that air-fuel ratio learning control is executed under a condition that there is no request for increasing the temperature of the three-way catalyst 16.

If air-fuel ratio learning control is executed based on an interruption of execution of dither control caused by satisfaction of the termination condition (step S13: YES), the learning portion 435 activates an enhancement flag FLG (step S14) and proceeds to step S16, which will be described later. If execution of air-fuel ratio learning control is not based on an interruption of execution of dither control caused by satisfaction of the termination condition (step S13: NO), the learning portion 435 deactivates the enhancement flag FLG (step S15) and proceeds to next step S16. The enhancement flag FLG determines an execution mode of air-fuel ratio learning control.

In step S16, the learning portion 435 executes air-fuel ratio learning control. In air-fuel ratio learning control, the learning portion 435 updates the air-fuel ratio learning value KG in each predetermined control cycle CS so that the air-fuel ratio learning value KG gradually changes. For example, when the air-fuel ratio learning value KG needs to be increased so that the air-fuel ratio F/B correction value FAF approaches zero, the air-fuel ratio learning value KG is gradually increased. In this case, as shown in FIG. 4, the air-fuel ratio learning value KG is incremented by a specified value $\Delta KG$ in each control cycle CS. When the air-fuel ratio learning value KG needs to be decreased so that the air-fuel ratio F/B correction value FAF approaches zero, the air-fuel ratio learning value KG is gradually decreased. In this case, the air-fuel ratio learning value KG is decremented by the specified value $\Delta KG$ in each specified control cycle CS.

In air-fuel ratio learning control executed in the present embodiment, the specified value $\Delta KG$ is changed depending on whether or not the enhancement flag FLG is activated.

Figure 4:
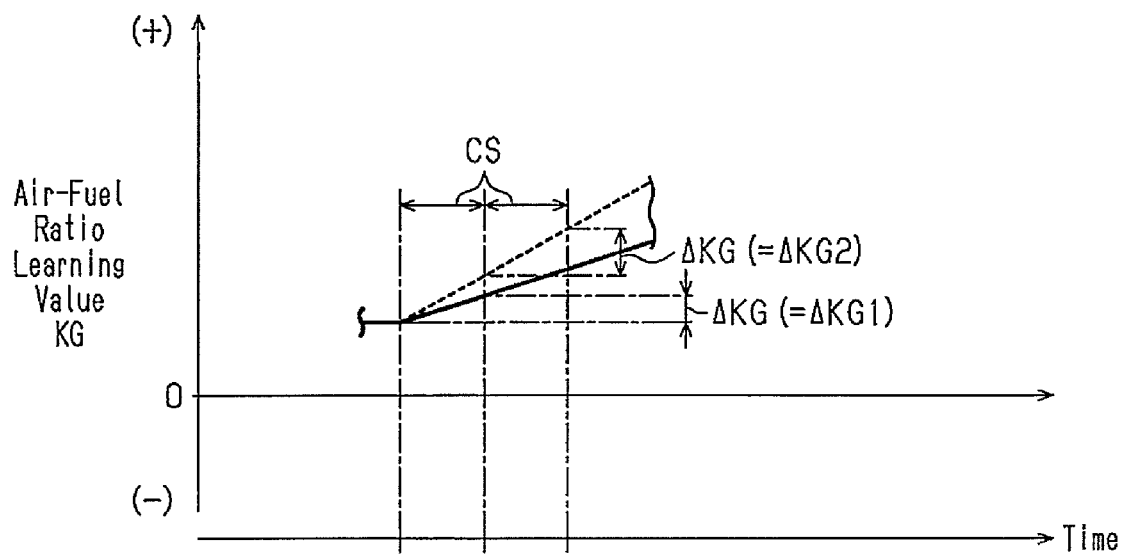
FIG. 4 is a time chart of an air-fuel ratio learning value when air-fuel ratio learning control is executed.

When the enhancement flag FLG is not activated, the specified value ΔKG is set to a first value ΔKG1 as indicated by the solid line in FIG. 4. When the enhancement flag FLG is activated, the specified value ΔKG is set to a second value ΔKG2 that is greater than the first value ΔKG1 as indicated by the broken line in FIG. 4. As shown in FIG. 4, when air-fuel ratio learning control is executed with the enhancement flag FLG activated, the air-fuel ratio learning value KG is updated at a higher speed than when the enhancement flag FLG is not activated. When the update of the air-fuel ratio learning value KG is completed, the learning portion 435 ends the process routine.

A process routine executed by the request value output portion 441 of the dither control unit 44 will now be described with reference to FIG. 5. The process routine is repeatedly executed.

Figure 5:
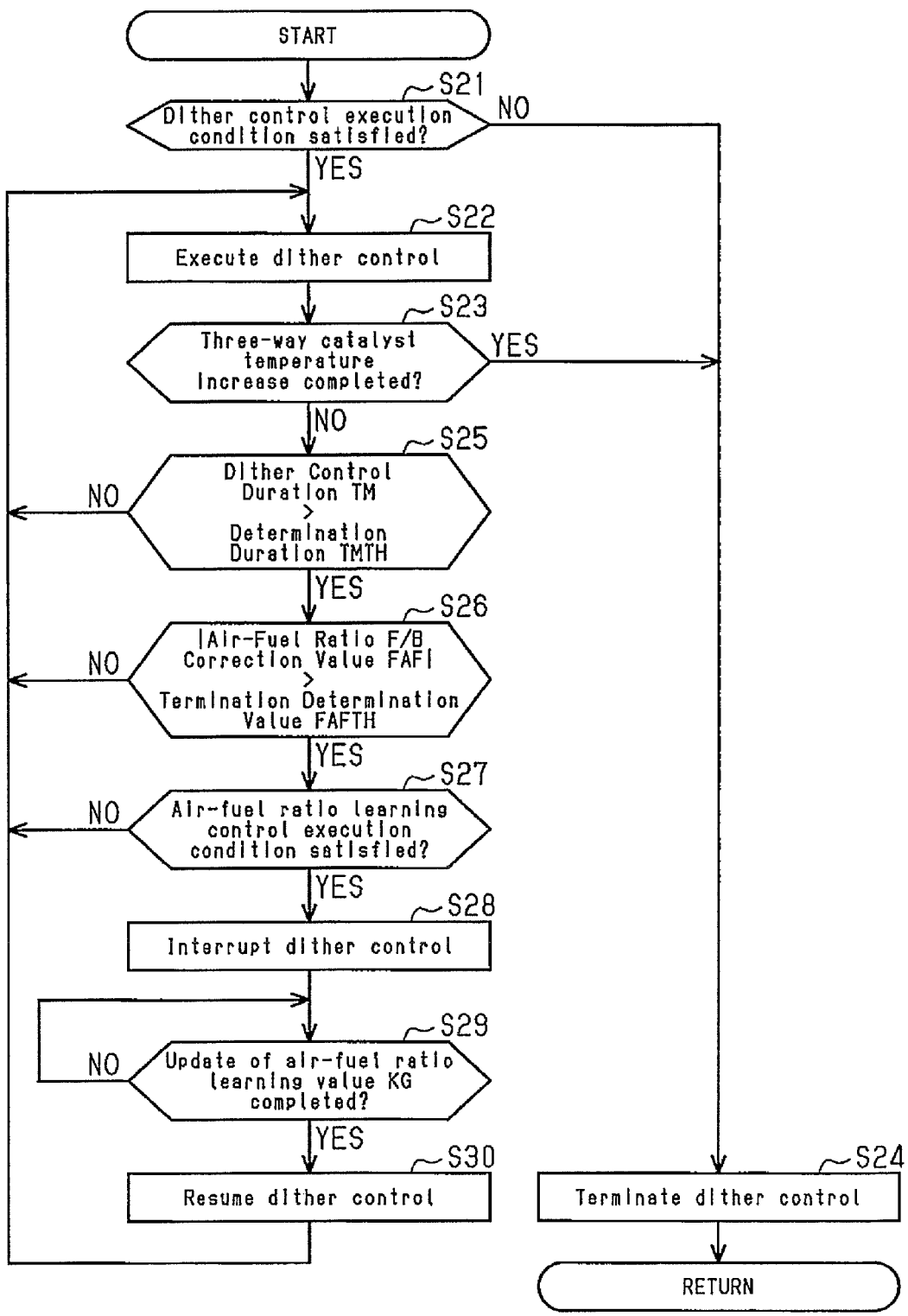
FIG. 5 is a flowchart showing a process routine executed when dither control is executed.

As shown in FIG. 5, in the process routine, the request value output portion 441 determines whether or not the dither control execution condition described above is satisfied (step S21). If the dither control execution condition is not satisfied (step S21: NO), the request value output portion 441 proceeds to step S24, which will be described later. If the dither control execution condition is satisfied (step S21: YES), the request value output portion 441 calculates the injection amount correction request value α. More specifically, the request value output portion 441 sets the injection amount correction request value α to a value greater than zero and executes dither control (step S22).

The request value output portion 441 determines whether or not an increase in the temperature of the three-way catalyst 16 is completed (step S23). If the increase in the temperature of the three-way catalyst 16 is completed (step S23: YES), the request value output portion 441 proceeds to next step S24. In step S24, the request value output portion 441 sets the injection amount correction request value α to a value equal to zero and terminates the execution of dither control. Then, the request value output portion 441 ends the process routine.

If the increase in the temperature of the three-way catalyst 16 is incomplete (step S23: NO), the request value output portion 441 determines whether or not the dither control termination condition is satisfied (steps S25, S26, and S27). If all of the conditions, which are a duration TM of dither control exceeds a determination duration TMTH corresponding to a determination time (step S25: YES), the absolute value of the air-fuel ratio F/B correction value FAF is greater than a termination determination value FAFTH (step S26: YES), and the air-fuel ratio learning condition described above is satisfied (step S27: YES), the request value output portion 441 determines that the dither control termination condition is satisfied. If the duration TM of dither control is less than or equal to the determination duration TMTH (step S25: NO), the request value output portion 441 determines that the termination condition is not satisfied. If the absolute value of the air-fuel ratio F/B correction value FAF is less than or equal to the termination determination value FAFTH (step S26: NO), the request value output portion 441 determines that the termination condition is not satisfied. If the air-fuel ratio learning condition is not satisfied (step S27: NO), the request value output portion 441 determines that the termination condition is not satisfied.

When air-fuel ratio learning control is not executed, the properties of components of the internal combustion engine 10 change due to, for example, increases in the temperature of the components. This causes the air-fuel ratio detection value AF to have a tendency to deviate from the target air-fuel ratio AFT. Accordingly, the absolute value of the air-fuel ratio F/B correction value FAF tends to be increased. In this regard, the determination duration TMTH is set as a reference that determines whether or not the air-fuel ratio detection value AF has a tendency to deviate from the target air-fuel ratio AFT while execution of air-fuel ratio learning control is prohibited during execution of dither control.

Additionally, the termination determination value FAFTH is set as a reference that determines whether or not the absolute value of the air-fuel ratio F/B correction value FAF is increased to some level. When the dither control termination condition is not satisfied, the request value output portion 441 proceeds to step S22, which has been described above. When the dither control termination condition is satisfied, the request value output portion 441 proceeds to next step S28.

In step S28, the request value output portion 441 sets the injection amount correction request value α to a value equal to zero and interrupts the execution of dither control. Then, the request value output portion 441 determines whether or not updates of the air-fuel ratio learning values KG are completed in all of the learning regions set in the learning value storage portion 436 (step S29). If the update of the air-fuel ratio learning value KG is incomplete in at least one of the learning regions (step S29: NO), the request value output portion 441 repeatedly performs the determination of step S29. If the updates of the air-fuel ratio learning values KG are completed in all of the learning regions (step S29: YES), the request value output portion 441 sets the injection amount correction request value α to a value greater than zero and resumes the execution of dither control (step S30). The request value output portion 441 proceeds to step S22, which is described above.

The operation and effects obtained when dither control is performed will now be described with reference to FIG. 6.

Figure 6:
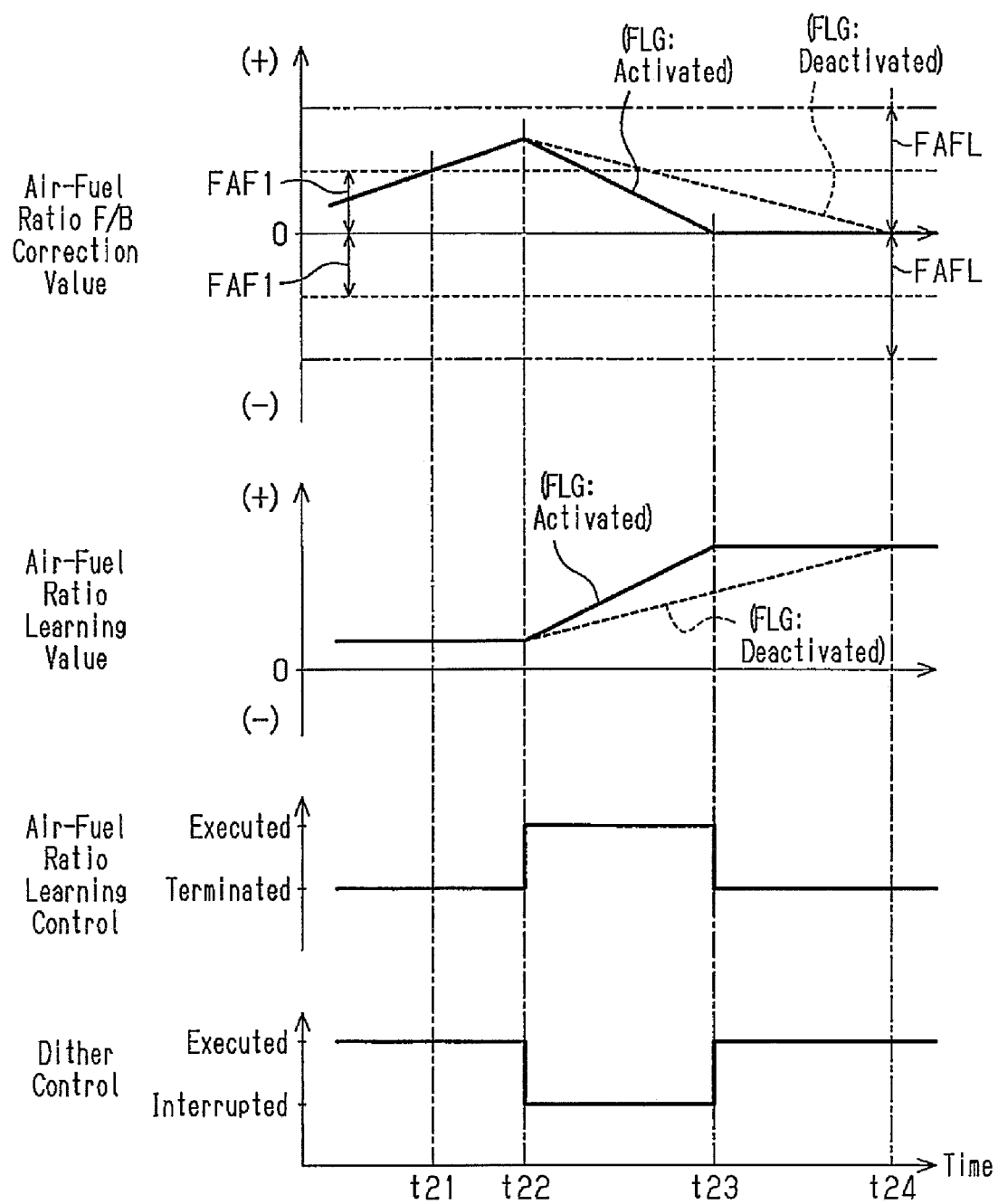
FIG. 6 is a time chart corresponding to when air-fuel ratio learning control is executed based on an interruption of execution of dither control.

As shown in FIG. 6, during execution of dither control, the exhaust gas flowing through the air-fuel ratio sensor 31 in the exhaust passage 15 may, contain a large amount of oxygen or a small amount of oxygen. This causes the air-fuel ratio detection value AF to easily vary. Under a situation in which the air-fuel ratio detection value AF varies as described above, if air-fuel ratio learning control is executed to update the air-fuel ratio learning value KG, the accuracy for updating the air-fuel ratio learning value KG may be lowered.

In the present embodiment, while dither control is executed, execution of air-fuel ratio learning control is prohibited. Thus, the air-fuel ratio learning value KG will not be updated with low accuracy. This limits lowering of the accuracy for updating the air-fuel ratio learning value KG and the accuracy for controlling the air-fuel ratio.

When air-fuel ratio learning control is not performed due to execution of dither control, the properties of components of the internal combustion engine 10 may change due to, for example, increases in the temperature of the components, causing the air-fuel ratio detection value AF to have a tendency to deviate from the target air-fuel ratio AFT. Accordingly, the absolute value of the air-fuel ratio F/B correction value FAF increases.

The air-fuel ratio F/B correction value FAF has a limit on the update range. The upper limit of the update range of the air-fuel ratio F/B correction value FAF is a limit value FAFL shown in FIG. 6. More specifically, when the absolute value of the air-fuel ratio F/B correction value FAF is equal to the limit value FAFL, the air-fuel ratio F/B correction value FAF cannot be updated such that the absolute value is further increased.

In the example shown in FIG. 6, at time t21, the absolute value of the air-fuel ratio F/B correction value FAF exceeds a specified correction value FAF1. Under a situation in which the difference of the air-fuel ratio F/B correction value FAF and the limit value FAFL is small as described above, if the absolute value of the air-fuel ratio F/B correction value FAF needs to be further increased, the limitation may be imposed on an update of the air-fuel ratio F/B correction value FAF. With the limitation imposed on an update of the air-fuel ratio F/B correction value FAF, the air-fuel ratio F/B correction value FAF cannot be further increased, and the deviation of the air-fuel ratio detection value AF from the target air-fuel ratio AFT may not be eliminated.

In this regard, in the present embodiment, when the absolute value of the air-fuel ratio F/B correction value FAF is greater than the specified correction value FAF1, it is determined that the absolute value of the air-fuel ratio feedback correction value FAF is increased to some level. After time t22, with the execution of dither control interrupted, air-fuel ratio learning control is executed. In this case, the interruption of the execution of dither control limits variations of the air-fuel ratio detection value AF and allows the air-fuel ratio learning value KG to be updated with high accuracy. The air-fuel ratio learning value KG that is updated with high accuracy is used to control the air-fuel ratio. This decreases the absolute value of the air-fuel ratio feedback correction value FAF and reduces situations in which the limitation is imposed on the update of the air-fuel ratio feedback correction value FAF. Accordingly, situations in which the deviation of the air-fuel ratio detection value AF from the target air-fuel ratio AFT cannot be eliminated are reduced.

Even when the absolute value of the air-fuel ratio feedback correction value FAF is greater than the specified correction value FAF1, if the execution condition of air-fuel ratio learning control is not satisfied, air-fuel ratio learning control will not be executed. In the present embodiment, during the period from time t21 to time t22, in which air-fuel ratio learning control cannot be executed because the execution condition of air-fuel ratio learning control is not satisfied, dither control continues to be executed. This maximizes the duration of dither control and allows an early completion of the increase in the temperature of the three-way catalyst 16.

When air-fuel ratio learning control is executed based on an interruption of execution of dither control caused by satisfaction of the termination condition described above, the air-fuel ratio learning value KG is updated at a higher speed than when air-fuel ratio learning control is executed when there is no request for increasing the temperature of the three-way catalyst 16.

The broken line in FIG. 6 shows an example in which air-fuel ratio learning control is executed with the enhancement flag FLG deactivated. In this case, the update of the air-fuel ratio learning value KG is completed at time t24. Thus, dither control is resumed at time t24.

Additionally, the solid line in FIG. 6 shows an example in which air-fuel ratio learning control is executed with the enhancement flag FLG activated. In this case, the specified value ΔKG is set to the greater value (i.e., the second value ΔKG2) than when the enhancement flag FLG is deactivated. Thus, the update of the air-fuel ratio learning value KG is completed at time t23, which is before time t24. Air-fuel ratio learning control is completed at an earlier time, and dither control is also resumed at an earlier time.

The above embodiment may be modified as follows.

In the above embodiment, when the enhancement flag FLG is activated, the update speed of the air-fuel ratio learning value KG is continuously higher than when the enhancement flag FLG is deactivated. Instead, when the enhancement flag FLG is activated, a situation in which the absolute value of the air-fuel ratio feedback correction value FAF is decreased to some level may trigger a decrease in the update speed of the air-fuel ratio learning value KG to the same level as when the enhancement flag FLG is deactivated. For example, the absolute value of the air-fuel ratio F/B correction value FAF obtained when completion of an update of the air-fuel ratio learning value KG is determinable is used as a completion determination value, and a value between the completion determination value and the specified correction value FAF1 is used as a switch determination value. When the enhancement flag FLG is activated, if the absolute value of the air-fuel ratio F/B correction value FAF is greater than or equal to the switch determination value, the specified value ΔKG is set to a value equal to the second value iKG2. When the absolute value of the air-fuel ratio F/B correction value FAF is less than the switch determination value, the specified value LKG is switched from the second value ΔKG2 to the first value ΔKG1.

The specified value ΔKG does not have to be variable as long as when air-fuel ratio learning control is executed based on an interruption of execution of dither control caused by satisfaction of the above termination condition, the update speed of the air-fuel ratio learning value KG is higher than the update speed of the air-fuel ratio learning value KG under a situation in which there is no request for increasing the temperature of the three-way catalyst 16. For example, during air-fuel ratio learning control with the enhancement flag FLG activated, the update cycle of the air-fuel ratio learning value KG (control cycle CS shown in FIG. 4) can be shortened as compared to during execution of air-fuel ratio learning control with the enhancement flag FLG deactivated. In this case, air-fuel ratio learning control is terminated at an earlier time, and dither control is also resumed at an earlier time.

The update speed of the air-fuel ratio learning value KG does not have to be variable depending on whether or not air-fuel ratio learning control is executed based on an interruption of execution of dither control caused by satisfaction of the above termination condition.

In the above embodiment, the dither control termination condition includes a condition that the air-fuel ratio learning condition is satisfied. Thus, a time lag will not occur from when execution of dither control is interrupted by satisfaction of the termination condition, that is, when the prohibition of execution of air-fuel ratio learning control is cancelled, until the air-fuel ratio learning condition is satisfied and air-fuel ratio learning control starts to be executed. However, as long as a condition that the absolute value of the air-fuel ratio feedback correction value FAF is greater than the specified correction value FAF1 is included, the dither control termination condition does not have to include a condition that the air-fuel ratio learning condition is satisfied. In this case, a time lag may occur from when execution of dither control is interrupted, that is, when prohibition of execution of air-fuel ratio learning control is cancelled, until the air-fuel ratio learning condition is satisfied and air-fuel ratio learning control starts to be executed.

As long as a condition that the absolute value of the air-fuel ratio feedback correction value FAF is greater than the specified correction value FAF1 is included, the dither control termination condition does not have to include a condition that the duration TM of dither control is greater than the determination duration TMTH. For example, the termination condition may include a condition that the absolute value of the air-fuel ratio feedback correction value FAF being greater than the specified correction value FAF1 and the air-fuel ratio learning condition being satisfied are both satisfied. In this case, in the same manner as the above embodiment, a time lag will not occur from when execution of dither control is interrupted by satisfaction of the termination condition, that is, when the prohibition of execution of air-fuel ratio learning control is cancelled, until the air-fuel ratio learning condition is satisfied and air-fuel ratio learning control starts to be executed.

Even when the absolute value of the air-fuel ratio feedback correction value FAF is increased during execution of dither control, the execution of dither control may continue until the increase in the temperature of the three-way catalyst 16 is completed. In this case, after dither control is terminated, satisfaction of the air-fuel ratio learning condition triggers execution of air-fuel ratio learning control.

When execution of dither control will not be terminated until the increase in the temperature of the three-way catalyst 16 is completed, the limit value FAFL of the air-fuel ratio F/B correction value FAF may be set to be greater when dither control is executed than when dither control is not executed. This limits lowering of the accuracy for controlling the air-fuel ratio during execution of dither control.

In dither control of the above embodiment, the fuel supply amount to a rich combustion cylinder and the fuel supply amount to a lean combustion cylinder are adjusted so that the average value of air-fuel ratios of mixtures in all of the cylinders #1 to #4 equals to the stoichiometric air-fuel ratio. However, as long as the air-fuel ratio of a mixture in the rich combustion cylinder is richer than the stoichiometric air-fuel ratio and the air fuel-ratio of a mixture in the lean combustion cylinder is leaner than the stoichiometric air-fuel ratio, the average value of the air-fuel ratios of mixtures in all of the cylinders #1 to #4 may differ from the stoichiometric air-fuel ratio.

In the above embodiment, the number of lean combustion cylinders is greater than the number of rich combustion cylinders. Instead, for example, the number of lean combustion cylinders may be equal to the number of rich combustion cylinders or the number of lean combustion cylinders may be less than the number of rich combustion cylinders. Further, as long as the cylinders #1 to #4 include a lean combustion cylinder and a rich combustion cylinder, a stoichiometric combustion cylinder, in which the air-fuel ratio of the mixture is equal to the stoichiometric air-fuel ratio, may be included.

In the above embodiment, the example in which the rich combustion cylinder is fixed to the first cylinder #1 is described. However, the rich combustion cylinder may be appropriately changed during execution of dither control.

The catalyst arranged in the exhaust passage 15 may be other than the three-way catalyst 16 as long as the temperature can be increased by burning unburned fuel components and incomplete combustion components discharged from a rich combustion cylinder with oxygen contained in the exhaust gas discharged from a lean combustion cylinder. The catalyst may be a gasoline particulate filter that functions as a three-way catalyst.

The internal combustion engine 10 may be an internal combustion engine having six cylinders.

The internal combustion engine 10 may be an internal combustion engine including an injection valve that injects fuel into the intake passage 12. Further, the internal combustion engine 10 may be an internal combustion engine in which each cylinder is provided with a fuel injection valve 13 that directly injects fuel into the combustion chamber 11 and an injection valve that injects fuel into the intake passage 12.

The present examples and embodiments are to be considered as illustrative and not restrictive, and the invention is not to be limited to the details given herein, but may be modified within the scope and equivalence of the appended claims.

The invention claimed is:

1. A controller for an internal combustion engine that includes a catalyst arranged in an exhaust passage into which exhaust gas is discharged from a plurality of cylinders, wherein the catalyst purifies the exhaust gas, the controller comprising:
    an air-fuel ratio control unit that is configured to correct an amount of fuel supplied to each of the plurality of cylinders based on an air-fuel ratio feedback correction value and an air-fuel ratio learning value; and
    a dither control unit that is configured to execute dither control when there is a request for increasing a temperature of the catalyst, wherein the dither control adjusts the amount of fuel supplied to each of the plurality of cylinders that is corrected by the air-fuel ratio control unit so that at least one of the plurality of cylinders is set to a rich combustion cylinder in which an air-fuel ratio of a first mixture of air and fuel supplied to the rich combustion cylinder is richer than a stoichiometric air-fuel ratio and at least a further one of the plurality of cylinders is set to a lean combustion cylinder in which an air-fuel ratio of a second mixture of air and fuel supplied to the lean combustion cylinder is leaner than the stoichiometric air-fuel ratio, wherein
    the air-fuel ratio control unit is configured to execute air-fuel ratio feedback control that updates the air-fuel ratio feedback correction value to decrease a deviation of an air-fuel ratio detection value calculated based on a detection signal of an air-fuel ratio sensor from a target air-fuel ratio,
    the air-fuel ratio control unit is configured to execute air-fuel ratio learning control that updates the air-fuel ratio learning value to decrease an absolute value of the air-fuel ratio feedback correction value, and
    the air-fuel ratio control unit is configured to prohibit execution of the air-fuel ratio learning control and execute the air-fuel ratio feedback control when the dither control is executed.

2. The controller for an internal combustion engine according to claim 1, wherein
    the dither control unit is configured to terminate execution of the dither control when a termination condition is satisfied,
    the termination condition includes a condition that the absolute value of the air-fuel ratio feedback correction value is greater than a specified correction value, and
    the air-fuel ratio control unit is configured to cancel prohibition of execution of the air-fuel ratio learning control when the termination condition is satisfied and execution of the dither control is terminated.

3. The controller for an internal combustion engine according to claim 2, wherein the termination condition further includes a duration of execution of the dither control being greater than or equal to a determination time.

4. The controller for an internal combustion engine according to claim 2, wherein the termination condition further includes a duration of execution of the dither control being greater than or equal to a determination time, and an execution condition of the air-fuel ratio learning control being satisfied.

5. The controller for an internal combustion engine according to claim 2, wherein the termination condition further includes an execution condition of the air-fuel ratio learning control being satisfied.

6. The controller for an internal combustion engine according to claim 2, wherein the dither control unit is configured to resume execution of the dither control on condition that the update of the air-fuel ratio learning value is completed by the air-fuel ratio learning control.

7. The controller for an internal combustion engine according to claim 2, wherein
the air-fuel ratio control unit is configured to perform the update of the air-fuel ratio learning value so that the air-fuel ratio learning value is gradually changed by the air-fuel ratio learning control, and
the air-fuel ratio control unit is configured so that when the air-fuel ratio learning control is executed based on an interruption of execution of the dither control caused by satisfaction of the termination condition, an update speed of the air-fuel ratio learning value is set to be higher than when the air-fuel ratio learning control is executed under a situation in which there is no request for increasing the temperature of the catalyst.

8. The controller for an internal combustion engine according to claim 7, wherein
the air-fuel ratio control unit is configured to perform the update of the air-fuel ratio learning value by incrementing the air-fuel ratio learning value by a specified value in each of specified control cycles when the air-fuel ratio learning control increases the air-fuel ratio learning value,
the air-fuel ratio control unit is configured to update the air-fuel ratio learning value by decrementing the air-fuel ratio learning value by the specified value in each of the control cycles when the air-fuel ratio learning control decreases the air-fuel ratio learning value, and
the air-fuel ratio control unit is configured so that when the air-fuel ratio learning control is executed based on an interruption of execution of the dither control caused by satisfaction of the termination condition, the specified value is set to be greater than when the air-fuel ratio learning control is executed under a situation in which there is no request for increasing the temperature of the catalyst.

\* \* \* \* \*